UNITED STATES PATENT OFFICE.

HENRI LOUIS JOSEPH CHAVASSIEU, OF LYON, FRANCE.

PROCESS OF OBTAINING SOLUBLE AND COAGULATABLE PROTEID COMPOSITION.

984,539.

Specification of Letters Patent. Patented Feb. 21, 1911.

No Drawing.

Application filed July 25, 1910. Serial No. 573,704.

*To all whom it may concern:*

Be it known that I, HENRI LOUIS JOSEPH CHAVASSIEU, a citizen of the French Republic, residing at Lyon, in France, have invented a certain new and useful Process of Obtaining Soluble and Coagulatable Proteid Compositions, of which the following is a specification.

This invention relates to improvements in the process of obtaining soluble and coagulatable proteid compositions described in the specification of my prior Letters Patent No. 950,435, granted the 22nd of February 1910 which discloses a process of obtaining such products capable of coagulation by sulfate of ammonia and diluted acids, by mixing with solutions of viscose, solutions of proteid xanthates obtained by causing alkalis and bi-sulfid of carbon to act on proteid substances. It has been found that for certain proteid substances such as casein, the successive action of alkali and of bi-sulfid of carbon is not indispensable and that the same results are obtained by treating said substances with alkaline sulfo-carbonates.

As an example of the improved process, one kilogram of casein is immersed in 3 kilograms of a solution of sulfo-carbonate of soda of 7 to 11% concentration. The mixture is worked up and 2 liters of water is added to it, whereupon it gives off sulfureted hydrogen and the mass gradually dissolves producing an extremely viscous solution. The viscosity of this solution can be reduced as desired by adding 200 to 500 grams of a 1% solution of caustic soda. The solutions obtained as described can be precipitated by acid acetate of lead which produces an unstable combination of bi-sulfid of carbon, protein and lead. When left to stand for some days the solutions coagulate and form an elastic and horny mass. This coagulation is more rapid in proportion as less soda is used. The solutions can be deemed to be proteid xanthates analogous to those obtained by treating proteins with alkali and bi-sulfid of carbon as described in the aforesaid Letters Patent. The said solutions are capable of coagulation by concentrated solutions of ammonia salts, notably solutions of sulfate of ammonia to produce a solid and plastic mass soluble in water but which becomes insoluble when it is treated with strong acids in a diluted state. An insoluble mass can also be directly obtained by treating said solutions with diluted acids and in the latter case they are mixed with a certain quantity of free sulfur. The solutions of proteid xanthates thus obtained with caseins can be coagulated by sulfate of ammonia and diluted acids in the form of threads, and pellicles and compressed tissues. The said solutions mixed with solutions of xanthates of cellulose give solutions of proteo-cellulosic xanthates having the same properties as those described in the aforesaid Letters Patent and which can be used in the manufacture of threads, pellicles and compressed tissues.

It is also mentioned in the specification of said Patent 950,435 that a solution of albuminoids and cellulose can be coagulated directly in an alkali. It has been since found that proteo-cellulosic solutions can be obtained capable of coagulation by ammonia salts (particularly sulfate of ammonia) and diluted acids by mixing solutions of viscose with alkaline solutions of proteid substances obtained by dissolving proteid substances in solutions of 8 or 10% of caustic alkali Na,OH, KOH, said solutions being capable of coagulation in the form of threads, pellicles and compressed tissues.

What I claim as my invention and desire to secure by Letters Patent of the United States is:—

In a process of obtaining soluble and coagulatable proteid compositions, the step which consists in submitting a proteid substance to the action of an alkaline sulfo-carbonate to produce a viscous solution.

In witness whereof I have signed this specification in the presence of two witnesses.

HENRI LOUIS JOSEPH CHAVASSIEU.

Witnesses:
JEAN GERMAIN,
GUILLAUME FIOCHE.